No. 656,264. Patented Aug. 21, 1900.
J. REVEL.
SKEIN HOLDER.
(Application filed June 13, 1900.)
(No Model.)

Witnesses:-
Jean Joze
Henry C. Wagner

Inventor:
Justinien Revel
By Ferguson & Gipson
Attorneys.

UNITED STATES PATENT OFFICE.

JUSTINIEN REVEL, OF ELLICOTT CITY, MARYLAND.

SKEIN-HOLDER.

SPECIFICATION forming part of Letters Patent No. 656,264, dated August 21, 1900.

Application filed June 13, 1900. Serial No. 20,121. (No model.)

*To all whom it may concern:*

Be it known that I, JUSTINIEN REVEL, a citizen of the United States, residing at Ellicott City, in the county of Howard and State of Maryland, have invented certain new and useful Improvements in Skein-Holders for Silk, Cotton, &c., of which the following is a specification.

This invention relates to a skein-holder for silk, cotton, and other similar material.

The object of the invention is to provide a holder for skeins of silk, cotton, or other similar material which can be easily and readily adjusted to fit any-sized skein and hold the same taut while being wound upon a spool or other similar device.

Other features of the invention will be fully set forth in the description of the accompanying drawings, in which—

Figure 1:
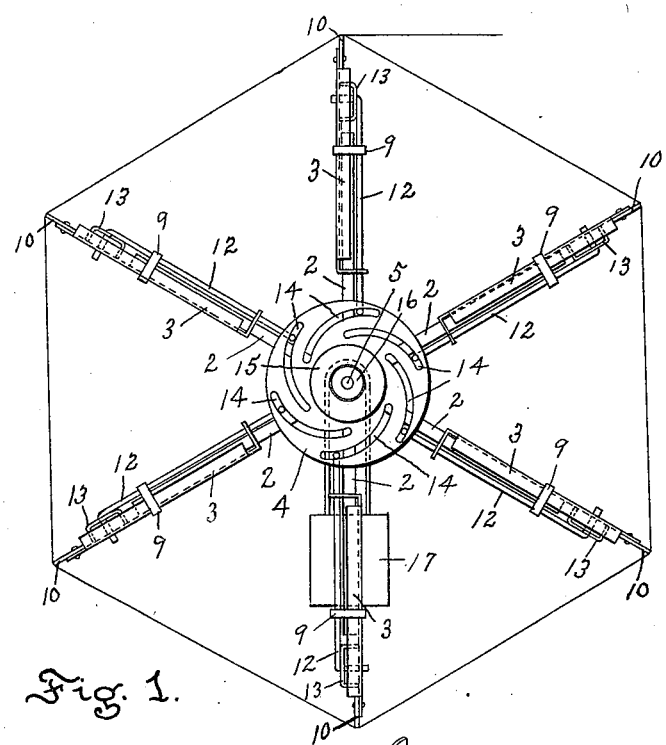
Figure 2:
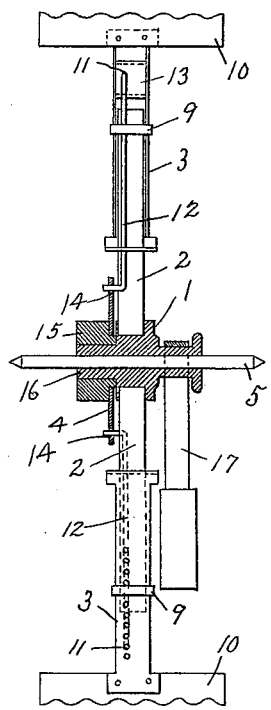
Figure 3:
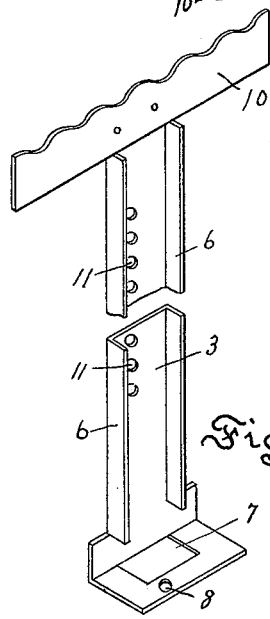
Figure 4:
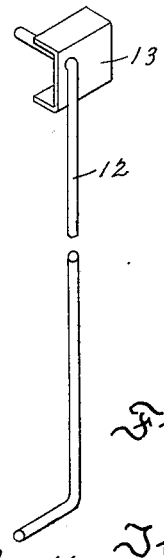

Figure 1 is a side elevation of my invention. Fig. 2 is an edge view of same, partly in section. Fig. 3 is a detailed perspective view of one of the adjustable arms. Fig. 4 is a detail perspective view of one of the connecting-rods.

Similar numerals refer to like and corresponding parts throughout the several views.

In the accompanying drawings, 1 designates a hub having a number of spokes 2 projecting therefrom, 3 the adjustable arms, and 4 the cam-disk. The hub 1 is provided with a shaft 5, extending through the center and projecting on each side thereof. This shaft 5 rests in any suitable bearing upon which the holder revolves.

Projecting from the periphery of the hub 1 are a plurality of spokes 2, made of any suitable material and of any desired length. Each of these spokes carries an adjustable T-shaped arm 3, having their sides 6 bent at right angles thereto to fit over the sides of the spokes 2, as shown in Fig. 1. The lower end of the arm 3 is also bent at right angles thereto and is provided with holes 7 and 8, through which the spokes 2 and rods 12, respectively, project. The arms 3 are held to the upper end of the spokes 2 by means of an elastic band 9. The cross-pieces 10, at the top of the arms 3, have their upper surfaces corrugated. When a skein of silk, cotton, or other like material is stretched on the cross-pieces 10, the threads of the material will rest in the said corrugations and be prevented from tangling when being wound from the holder upon a spool or other suitable device. The arms 3 are provided with a number of holes 11, through which the upper bent ends of the rods 12 project when the arms are set at any desired position and prevent the latter from moving up or down on the spokes 2. When it is desired to set the arms 3, the rods 12 are pulled outward from the spokes 2 against the tension of the band 9 until the upper bent end of the said rod is removed from the hole 11. The arm 3 is then moved up or down to the desired position and the end of the rod 12 allowed to enter the desired hole and is held therein by the elastic band 9. The rods 12 have their upper ends bent at right angles thereto to fit within the holes 11, as described. Near the upper ends the rods 12 are provided with lugs 13, which fit between the sides 6 of the arms 3 and prevent the said rods from turning. The lower ends of the rods 12 are also bent at right angles thereto and project through the slots 14 in the cam-disk 4, the purpose of which will be hereinafter set forth. The rods 12 are also held to the upper ends of the spokes 2 by means of the elastic band 9.

The cam-disk 4 is secured to one side of a collar 15, and the said disk and collar are fitted upon a trunnion 16, projecting from the side of the hub 1 and are free to turn thereon. The cam-disk 4 is provided with a number of slots 14, corresponding to the number of spokes 2. The lower ends of the rods 12 project through these slots 14, as shown in Figs. 1 and 2, and when the said disk is turned in a left-handed direction all the rods 12, and consequently the arms 3, will move outwardly simultaneously, giving the dive a greater circumference, and when turned in a right-handed direction the rods 12 and arms 3 will be drawn toward the center, thus giving the holder a less circumference. Thus after the arms 3 have been set to suit the size of the skein to be placed thereon the disk 4 serves to extend the arms 3 sufficient to take up any slack in the threads of the material, and thus hold the same firmly to the arms 3.

A friction-brake 17 is provided on one side of the hub 1 to prevent the holder from revolving too freely, and thus keep the threads of the material taut as it passes from the said holder to a spool or other suitable device upon which it is to be wound, whereby tangling and breaking of the threads will be prevented.

The operation of the device is as follows: The arms 3 are first set to fit any desired size skein to be placed thereon. The latter is then placed upon the arms 3, with the threads of the material resting in the corrugations of the cross-pieces 10. The collar 15 is then turned in a left-handed direction, which also turns the cam-disk 4, thereby forcing the rods 12, and consequently the arms 3, outwardly and taking up any slack in the skein and thoroughly tightening the threads on the arms of the holder. The end of the thread is then placed on a spool or other suitable device and wound thereon. The unwinding of the material from the holder will cause the latter to revolve; but the friction-brake 17 will keep the holder from turning too freely, thereby keeping the thread always taut as it passes from the holder to the spool and preventing tangling and breaking of the thread.

Having thus described my invention, what I claim is—

1. In a skein-holder, the combination of a hub; a cam-disk revoluble independent of the said hub; a plurality of spokes projecting from the periphery of the said hub; an adjustable arm on each of said spokes; a rod secured to each of the said spokes, said rods having their upper ends bent to fit into the holes in the said arms, and the opposite ends bent to fit within the slots in the cam-disk.

2. In a skein-holder, the combination of a hub; a plurality of spokes projecting from the periphery of the said hub; an adjustable arm on each of said spokes and having a series of holes therein; a cam-disk fitted on the said hub and revoluble independent thereof, said disk having a slot for each spoke; and a rod secured to each spoke and having the upper ends bent to fit within the holes in the arms and the lower ends bent to fit within the slots in the cam-disk, whereby when the disk is turned in one direction the arms will be forced outwardly and when turned in the opposite direction the said arms will be forced inwardly.

3. In a skein-holder, the combination of a hub, 1; a plurality of spokes, 2, projecting from the periphery of the hub; an adjustable T-shaped arm on each of the said spokes, having a series of holes, 11, therein; a disk, 4, having a number of cam-slots, 14, corresponding to the number of spokes, 2; a rod, 12, on each of said spokes, said rod having one end projecting through one of the holes, 11, and the opposite end projecting through one of the cam-slots, 14, whereby when the disk, 4, is turned in one direction the rods and arms will move outwardly from the center of the holder and when moved in the opposite direction the said rods and arms will move inwardly toward the center of the holder.

4. In a skein-holder, the combination of a hub, 1; a plurality of spokes, 2, secured to the hub; an adjustable arm, 3, on each of said spokes, 2, provided with holes, 11, and a corrugated cross-bar, 10; a cam-disk, 4, revoluble independent of the hub, and having a plurality of slots, 14, therein; a rod, 12, on each spoke connecting the adjustable arms with the slots in the cam-disk; an elastic band, 9, to hold the arms and rods firmly to the spokes; a lug, 13, on each rod to prevent the latter from turning; and a friction-brake, 17.

In testimony whereof I affix my signature in the presence of two witnesses.

JUSTINIEN REVEL.

Witnesses:
CHAPIN A. FERGUSON,
HENRY C. WAGNER.